April 28, 1931.  W. S. PIERCE, JR  1,802,829
FASTENING DEVICE
Filed Feb. 16, 1929
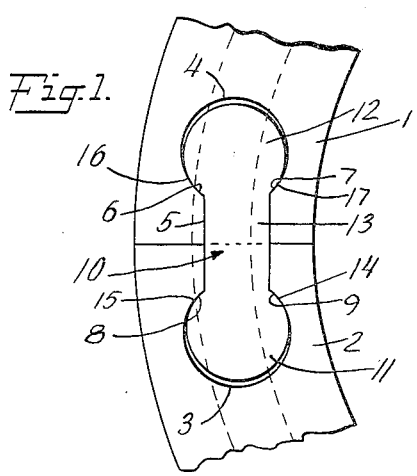
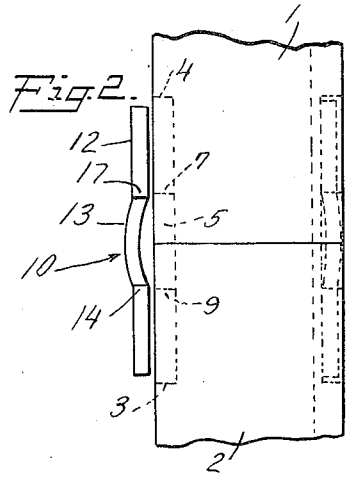
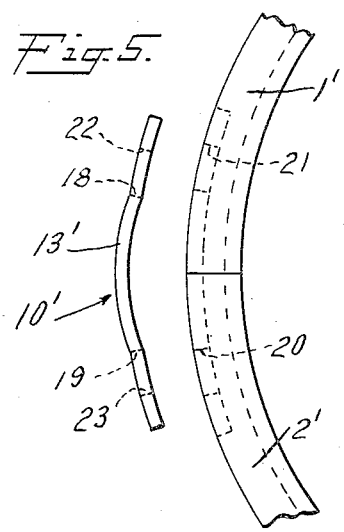
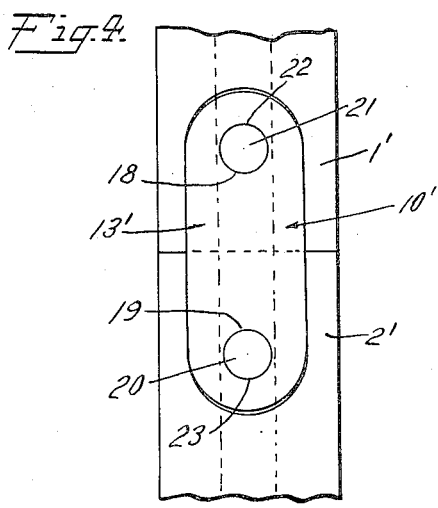
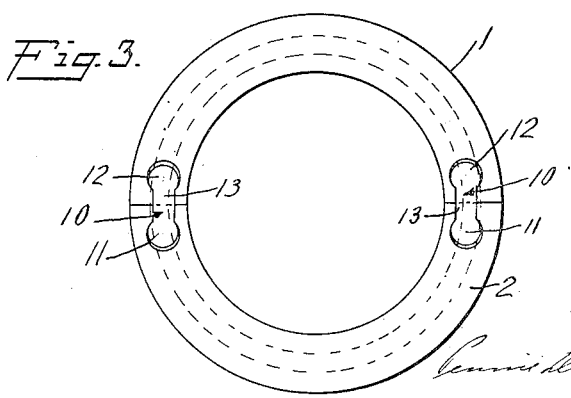
INVENTOR
BY
ATTORNEYS Patented Apr. 28, 1931

1,802,829

UNITED STATES PATENT OFFICE

WINSLOW S. PIERCE, JR., OF BAYVILLE, NEW YORK

FASTENING DEVICE

Application filed February 16, 1929. Serial No. 340,563.

This invention relates to fastening devices for machine elements, an object of the invention being to provide a simple and efficient fastening means for securing machine elements together and occupying a minimum of space.

In the art of making split bearing races, for example, the problem of fastening together the component parts is often a difficult one due to the limitations of space. For some applications it is impossible to allow space enough for bolts or other ordinary fastening means and it is an object of this invention to provide an efficient fastening device which can be used without making provisions for bolts, or the like. Under ordinary circumstances the lugs for accommodating bolts occupy considerable space in addition to that required by the bolts themselves, and oftentimes the space required by the fastening means is not greatly exceeded by that occupied by the parts fastened together. By utilizing the present invention the over-all dimensions of machine elements which must be fastened together may be greatly decreased.

In general my invention contemplates the provision of a fastening device in the form of a thin link adapted to fit in a shallow recess formed in adjacent parts of the elements to be fastened together. Portions of the link member form abutments adapted to engage corresponding abutments formed on the machine elements and preferably disposed below the surfaces of these elements. The abutments of the link are interconnected by a resilient arched portion of such a nature that by depressing or flexing this arched portion the abutments connected thereto may be separated to a slight extent, thereby bringing them into proper relationship to the abutments formed on the machine elements. The machine elements are preferably provided with recessed portions adapted to receive the entire fastening link or device whereby this device is entirely disposed below the exposed surfaces of the machine elements.

The various objects and advantages of this invention will be more apparent upon considering the following detailed description of certain embodiments of the invention illustrated in the accompanying drawings in which Fig. 1 is an end view of a portion of an anti-friction bearing race, the parts of which are fastened together in accordance with my invention;

Fig. 2 is a side elevation of the parts shown in Fig. 1;

Fig. 3 is an end elevation of a complete bearing race portions of which are shown in Figs. 1 and 2;

Fig. 4 is an elevation of another embodiment of my invention;

Fig. 5 is a side view of the device shown in Fig. 4, the fastening link being removed for purposes of illustration.

In Figs. 1, 2 and 3 of the accompanying drawings I have illustrated a two-part antifriction bearing race, the two halves of the race being shown at 1 and 2. The end faces of the two-part bearing race are provided with recesses or grooves. Each of these recesses may be regarded as comprising enlarged end portions 3 and 4 and a narrower portion 5 interconnecting the end portions. The recesses have side portions 6, 7, 8 and 9 which may be regarded as constituting abutments. The recesses are adapted to accommodate fastening links 10 each having a configuration corresponding with that of the recess cooperating therewith. In other words, each link has enlarged end portions 11 and 12 and a narrower interconnecting portion 13. These links may be made out of resilient metal, or the like, and the central portion 13 is slightly arched as best shown in Fig. 2. Before the link is applied to the machine elements the arched portions 13 are slightly shorter than the corresponding narrow portions of the recesses and the links will fit into the recesses only upon being stretched or deformed to an extent sufficient to separate the enlarged end portions 11 and 12 to make them register with the enlarged end portions of the recesses. This can be accomplished by depressing of flattening the arched portions 13 until the links snap into place in the recesses. Each link may be regarded as having a plurality of abutments 14, 15, 16 and 17 cooperating with the abutments 9, 8, 6 and 7 respectively of the machine elements and it will be understood that as soon as the links have been forced into the recesses the links tend to shorten exerting a considerable pressure on the abutments 6, 7, 8 and 9, thereby holding the two parts 1 and 2 firmly together.

The abutments 6, 7, 8 and 9 may be formed entirely below the adjacent surfaces of the machine elements 1 and 2 and the recesses for receiving the links 10 may be of sufficient depth so that the links are disposed entirely below the surfaces of the machine elements, thereby eliminating the necessity of providing additional space for the fastening means. Each link member 10 may consist of a single piece of resilient metal and the end portions of the links and of the recesses may be formed in any desired shapes consistent with providing cooperating abutments. For example, the end portions of the links and of the recesses, instead of being substantially circular, as illustrated in Figs. 1, 2 and 3, may be made triangular, rectangular or elliptical, or in any equivalent form.

By way of illustrating one of a number of possible variations of my invention I have shown in Figs. 4 and 5 machine elements 1' and 2' in the form of anti-friction bearing race parts fastened together by links 10' provided with internal abutments as distinguished from the external abutments 14, 15, 16 and 17 of the links 10. The link 10' shown in Figs. 4 and 5 is provided with holes or openings 18 and 19 adapted to fit over lugs or projections 20 and 21 carried by the machine elements 1' and 2'. These lugs or projections may be formed by cutting away portions of the machine elements to form a channel or recess adapted to receive the fastening link 10', the links being of a configuration corresponding with that of the cutaway portions of the machine elements. The central portion 13' of each link may be slightly arched so as to cause the link to grip the projections 20 and 21 firmly and it will be understood that the side portions 22 and 23 of the openings 18 and 19 may be regarded as abutments cooperating with the abutment-forming projections 20 and 21 carried by the machine elements 1' and 2'.

My improved fastening means is applicable, not only to fastening together parts having plane surfaces in alignment, as illustrated in Figs. 1, 2 and 3, but is also applicable to fastening together parts having curved aligned surfaces, as illustrated in Figs. 4 and 5. In the latter event the arched portions of the fastening links, such as that illustrated at 13', may be of slightly greater curvature than the exterior contour of the machine elements and it will be understood that in applying the fastening links to the machine elements the arched portions of the links are depressed or flexed so as to bring them more nearly into alignment with the exterior surfaces of the machine elements. Regardless of whether the links may be slightly curved, as illustrated in Figs. 4 and 5, or substantially straight, as illustrated in Figs. 1 and 2, each link may be regarded as having abutment-forming portions in approximate alignment, with an intermediate arched portion interconnecting the abutment-forming portions. The intermediate arched portions may serve, not only as means for exerting a considerable pressure tending to hold the machine elements together, but also as means for preventing lateral displacement of the machine elements in the direction of their line or plane of contact, and with this consideration in mind I prefer to so form the recesses in the links that the arched or central portions of the links fit closely against the sides of the recesses, thereby maintaining the machine elements in proper alignment at all times.

For purposes of illustration I have described certain embodiments of my invention as applied to the problem of fastening together the parts of a split anti-friction bearing race but it is to be understood that my invention is in no sense limited to this application for it may be employed wherever two machine elements are to be fastened together.

It is to be understood that my invention is not limited to the particular details illustrated and described but includes all modifications thereof falling within the scope of the appended claims.

I claim:

1. The combination with two machine elements, of a device for fastening said elements together comprising two abutments and an arched spring member interconnecting said abutments and adapted when depressed to separate said abutments, each of said elements having an abutment adapted to be engaged by the separated abutments of said device.

2. The combination with two machine elements, of a device for fastening said elements together, comprising two abutments and an arched spring member interconnecting said abutments, each of said elements having an abutment located below the surface thereof and adapted to be engaged by the separated abutments of said device, and having a recess for receiving said arched spring member.

3. The combination with two machine elements having surfaces disposed in approximate alignment, of a device for fastening said elements together comprising two abutments and an arched spring member interconnecting said abutments, each of said elements having an abutment located below the surface thereof and adapted to be engaged by the separated abutments of said device when said spring member is pressed into approximate alignment with said surface.

4. The combination with two machine elements, of a device for fastening said elements together, comprising two abutments and an arched spring member interconnecting said abutments, each of said elements having an abutment located below the surface thereof and adapted to be engaged by the separated abutments of said device, and having a recess for receiving said arched spring member with said spring member engaging the sides of said recess.

5. The combination with two machine elements having surfaces in substantial alignment, of a device for fastening said elements together comprising two abutments in approximate alignment with each other and an arched spring member interconnecting said abutments, each of said elements having an abutment located below the surface thereof and adapted to be engaged by the abutments of said device, and having a recess for receiving said arched spring member, the spring member and abutments connected thereto being disposed below the surfaces of said elements.

6. A fastening device comprising two end portions each having an edge forming an abutment, and an arched spring member interconnecting said end portions and adapted when depressed to separate said abutments.

7. A fastening device comprising a single strip of resilient sheet metal having enlarged end portions each having an edge forming an abutment, and an intermediate arched portion adapted when depressed to separate said end portions.

8. A fastening device for clamping together mutually supporting machine elements, comprising two abutments, an arched spring member interconnecting said abutments and adapted when depressed to separate said abutments whereby they may engage the machine elements with said spring member holding said elements together.

9. A fastening device for clamping together mutually supporting machine elements, comprising a single strip of resilient material having abutment-forming end portions and an intermediate arched portion adapted when depressed to separate said end portions whereby they may engage the machine elements with said arched portion holding said elements together.

10. A fastening device for clamping together mutually supporting machine elements, comprising a single strip of resilient sheet metal having abutment-forming end portions and an intermediate arched portion adapted when depressed to separate said end portions whereby they may engage the machine elements with said arched portion holding said elements together.

11. A fastening device for clamping together mutually supporting machine elements, comprising a single strip of resilient sheet metal having enlarged end portions forming abutments and an intermediate arched portion adapted when depressed to separate said end portions whereby they may engage the machine elements with said arched portion holding said elements together.

12. A fastening device for clamping together mutually supporting machine elements, comprising a single strip of resilient sheet metal of uniform thickness having abutment-forming end portions and an intermediate arched portion adapted when depressed to separate said end portions whereby they may engage the machine elements with said arched portion holding said elements together.

In testimony whereof I affix my signature.
WINSLOW S. PIERCE, Jr.